United States Patent
Funk et al.

(10) Patent No.: US 10,323,559 B1
(45) Date of Patent: Jun. 18, 2019

(54) METHODS FOR CONTROLLING SELECTIVE CATALYTIC REDUCTION SYSTEMS

(71) Applicant: GM GLOBAL TECHNOLOGY OPERATIONS LLC, Detroit, MI (US)

(72) Inventors: Sarah Funk, Canton, MI (US); Charles E. Dean, Clarkston, MI (US); Po-I Lee, Rochester Hills, MI (US); David P. Quigley, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 38 days.

(21) Appl. No.: 15/838,823

(22) Filed: Dec. 12, 2017

(51) Int. Cl.
*F01N 3/20* (2006.01)

(52) U.S. Cl.
CPC ........... *F01N 3/208* (2013.01); *F01N 3/2073* (2013.01); *F01N 2570/14* (2013.01); *F01N 2900/0402* (2013.01); *F01N 2900/1616* (2013.01); *F01N 2900/1806* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,281,572 B2* | 10/2012 | Chi | .......... | F01N 3/106 60/286 |
| 2010/0101215 A1* | 4/2010 | Wu | .......... | F01N 3/208 60/286 |
| 2010/0223907 A1* | 9/2010 | Walde | .......... | F01N 3/2066 60/274 |
| 2011/0219747 A1* | 9/2011 | Geveci | .......... | F01N 3/208 60/274 |
| 2013/0255233 A1* | 10/2013 | Yasui | .......... | F01N 3/10 60/286 |
| 2015/0218991 A1* | 8/2015 | Chavannavar | .......... | F01N 3/208 423/239.1 |

\* cited by examiner

*Primary Examiner* — Binh Q Tran (57) ABSTRACT

A selective catalytic reduction device (SCR) system performs intrusive steady state dosing correction (SSDC) when a NOx error between a predicted and measured downstream NOx value exceeds a threshold. In SSDC, if NOx breakthrough or NH3 slip is detected above a SSDC threshold, a short term reductant dosing adaptation occurs. Optionally long term dosing adaptations occur if the magnitude of previous short term adaptations exceed a short term adaptation threshold. If SSDC is insufficiently improving SCR performance based on the number of intrusive events occurring within a period of time and the change in NOx error during the time period, a method includes modifying the SSDC protocol by one or more of increasing the duration of short term adaptations, decreasing the SSDC threshold, and reducing the short term adaptation threshold. The method further includes subsequently inhibiting intrusive events from occurring.

20 Claims, 5 Drawing Sheets

METHODS FOR CONTROLLING SELECTIVE CATALYTIC REDUCTION SYSTEMS

BACKGROUND

Exhaust gas emitted from an internal combustion engine is a heterogeneous mixture that contains gaseous emissions such as carbon monoxide ("CO"), unburned hydrocarbons ("HC") and oxides of nitrogen ("NOx") as well as condensed phase materials (liquids and solids) that constitute particulate matter ("PM"). Catalyst compositions, typically disposed on catalyst supports or substrates, are provided in an engine exhaust system as part of an aftertreatment system to convert certain or all of these exhaust constituents.

Exhaust gas treatment systems, such as those appurtenant to diesel engines, typically include selective catalytic reduction devices (SCR). An SCR includes a substrate having an SCR catalyst disposed thereon to reduce the amount of NOx in the exhaust gas. The typical exhaust treatment system also includes a reductant delivery system that injects a reductant such as, for example, ammonia ($NH_3$), urea ($CO(NH_2)_2$, etc.). The SCR makes use of $NH_3$ to reduce the NOx. For example, when the proper amount of $NH_3$ is supplied to the SCR under the proper conditions, the $NH_3$ reacts with the NOx in the presence of the SCR catalyst to reduce the NOx emissions. If the reduction reaction rate is too slow, or if there is excess ammonia in the exhaust, ammonia can slip from the SCR. On the other hand, if there is too little ammonia in the exhaust, SCR NOx conversion efficiency will be decreased.

SUMMARY

Provided is a method for controlling a selective catalytic reduction device (SCR) system. The SCR is configured to receive exhaust gas and reductant, and the system further includes a controller capable of predicting NOx concentration downstream of the SCR and controlling reductant dosing to the SCR via a computer implemented chemical model. Iteratively, during steady state conditions, the system performs steady state dosing correction (SSDC) by comparing a SCR downstream NOx measurement with a predicted NOx value to determine a NOx error, initiating an intrusive event by modulating reductant dosing to determine the degree of NOx breakthrough or reductant slip occurring prior to initiation of the intrusive event if the NOx error exceeds a NOx error threshold, making a short term adaptation to reductant dosing in order to reduce NOx breakthrough or reductant slip for a period of time as determined by a plausibility timer if the degree of NOx breakthrough or reductant slip exceeds a respective NOx breakthrough threshold or reductant slip threshold, and optionally making a long term adaptation to reductant dosing if the magnitude of short term adaptations exceeds a short term adaptation threshold. The method includes determining that the SSDC is insufficiently improving SCR performance based on the number of intrusive events occurring within a period of time and the change in NOx error during the time period and modifying the SSDC protocol. The SSDC protocol can be modified by one or more of increasing the plausibility timer, decreasing one or more of the NOx breakthrough threshold and reductant slip threshold, and reducing the short term adaptation threshold. The short term reductant dosing adaptation can be made by modifying the reductant storage estimation of the chemical model. Reductant can be dosed by a reductant injector, and the long term reductant dosing adaptation can be made by modifying an energizing time of the reductant injector. The plausibility timer can be modified for a plurality of intrusive events. The exhaust gas can be communicated to the SCR by an internal combustion engine.

Also provided is a method for controlling a selective catalytic reduction device (SCR) system. The SCR is configured to receive exhaust gas and reductant, and the system further includes a controller capable of predicting NOx concentration downstream of the SCR and controlling reductant dosing to the SCR via a computer implemented chemical model. Iteratively, during steady state conditions, the system performs steady state dosing correction (SSDC) by comparing a SCR downstream NOx measurement with a predicted NOx value to determine a NOx error, initiating an intrusive event by modulating reductant dosing to determine the degree of NOx breakthrough or reductant slip occurring prior to initiation of the intrusive event if the NOx error exceeds a NOx error threshold, making a short term adaptation to reductant dosing in order to reduce NOx breakthrough or reductant slip for a period of time if the degree of NOx breakthrough or reductant slip exceeds a respective NOx breakthrough threshold or reductant slip threshold, and optionally making a long term adaptation to reductant dosing if the magnitude of short term adaptations exceeds a short term adaptation threshold. The method includes determining that the SSDC is insufficiently improving SCR performance based on the number of intrusive events occurring within a period of time and the change in NOx error during the time period, and inhibiting intrusive events from occurring. Inhibiting intrusive events from occurring can include preventing intrusive events from occurring for an inhibition period. A short term adaptation can be effective for a period of time as determined by a plausibility timer, and the inhibition period can begin after the plausibility timer for the most recent short term adaptation has expired. Inhibiting intrusive events from occurring can include temporarily increasing the NOx error threshold. Inhibiting intrusive events from occurring can include permanently increasing the NOx error threshold. The NOx error threshold can be permanently increased if the magnitude of temporary NOx error threshold increases within a time period exceeds a permanent NOx error threshold. The permanent NOx error threshold can include a number of temporary increases to the NOx error threshold within a given time period, or an integration of the NOx error threshold increases within a time period. The short term reductant dosing adaptation can be made by modifying the reductant storage estimation of the chemical model. The reductant can be dosed by a reductant injector, and the long term reductant dosing adaptation can be made by modifying an energizing time of the reductant injector. The exhaust gas can be communicated to the SCR by an internal combustion engine.

Also provided is a method for controlling a selective catalytic reduction device (SCR) system. The SCR is configured to receive exhaust gas and reductant, and the system further includes a controller capable of predicting NOx concentration downstream of the SCR and controlling reductant dosing to the SCR via a computer implemented chemical model. Iteratively, during steady state conditions, the system performs steady state dosing correction (SSDC) by comparing a SCR downstream NOx measurement with a predicted NOx value to determine a NOx error, initiating an intrusive event by modulating reductant dosing to determine the degree of NOx breakthrough or reductant slip occurring prior to initiation of the intrusive event if the NOx error exceeds a NOx error threshold, making a short term adaptation to reductant dosing in order to reduce NOx breakthrough or reductant slip for a period of time as determined by a plausibility timer if the degree of NOx breakthrough or reductant slip exceeds a respective NOx breakthrough threshold or reductant slip threshold, and optionally making a long term adaptation to reductant dosing if the magnitude of short term adaptations exceeds a short term adaptation threshold. The method includes determining that the SSDC is insufficiently improving SCR performance based on the number of intrusive events occurring within a period of time and the change in NOx error during the time period, modifying the SSDC protocol, and subsequently inhibiting intrusive events from occurring. Modifying the SSDC protocol can include one or more of increasing the plausibility timer, decreasing one or more of the NOx breakthrough threshold and reductant slip threshold, and reducing the short term adaptation threshold. Inhibiting intrusive events from occurring comprises one or more of preventing intrusive events from occurring for an inhibition period, temporarily increasing the NOx error threshold, or permanently increasing the NOx error threshold. The short term reductant dosing adaptation can be made by modifying the reductant storage estimation of the chemical model. The reductant can be dosed by a reductant injector, and the long term reductant dosing adaptation can be made by modifying an energizing time of the reductant injector. The exhaust gas can be communicated to the SCR by an internal combustion engine that powers a vehicle.

The above features and advantages, and other features and advantages of the disclosure are readily apparent from the following detailed description when taken in connection with the accompanying drawings.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory module that executes one or more software or firmware programs, a combinational logic circuit, and/or other suitable components that provide the described functionality.

Figure 1:
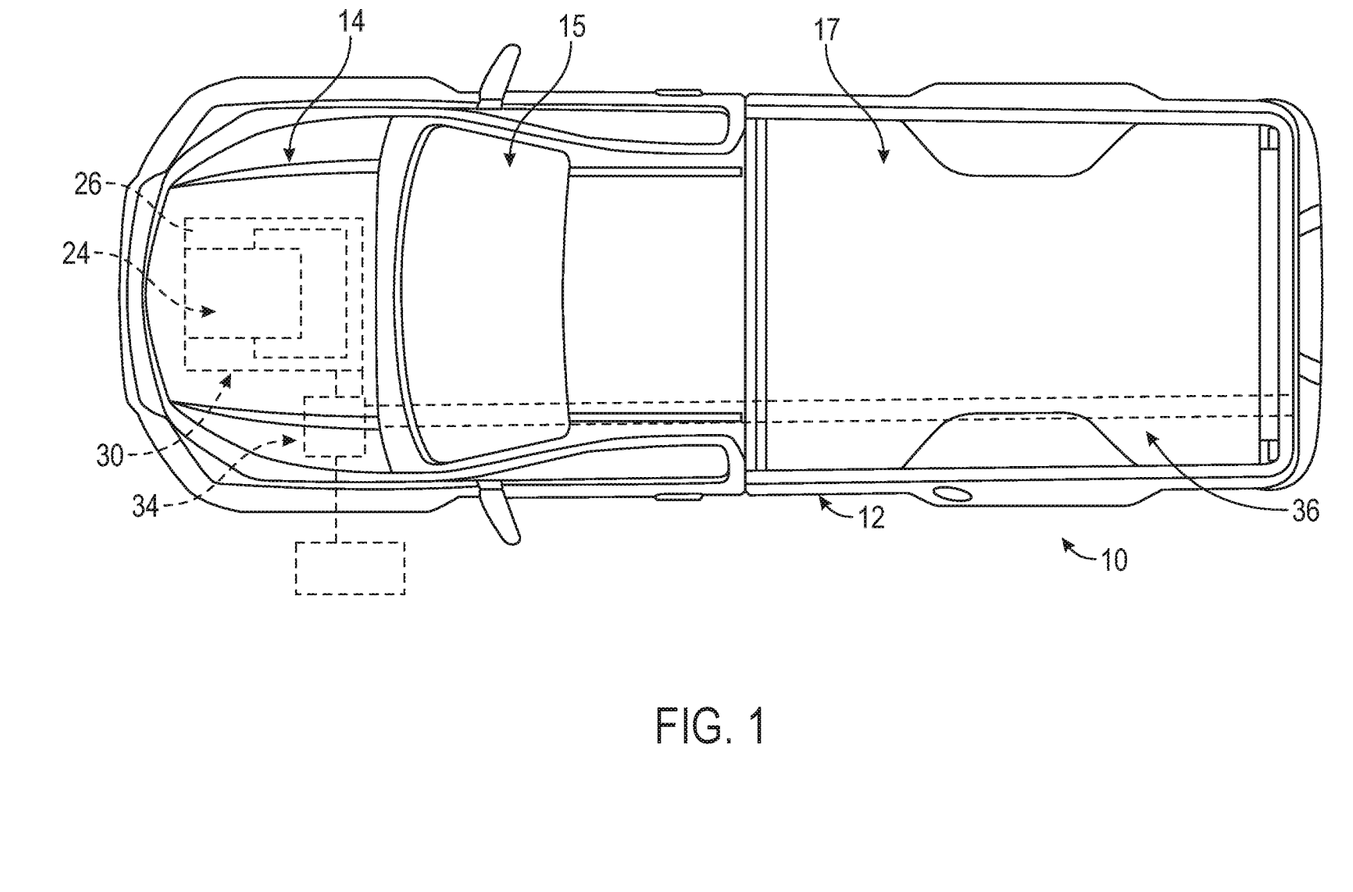
FIG. 1 illustrates a motor vehicle including an internal combustion engine and an emission control system, according to one or more embodiments.

A motor vehicle, in accordance with an aspect of an exemplary embodiment, is indicated generally at 10 in FIG. 1. Motor vehicle 10 is shown in the form of a pickup truck. It is to be understood that motor vehicle 10 may take on various forms including automobiles, commercial transports, marine vehicles, and the like. Motor vehicle 10 includes a body 12 having an engine compartment 14, and optionally a passenger compartment 15 and/or a cargo bed 17. Engine compartment 14 houses an internal combustion engine (ICE) system 24, which may include a diesel engine 26 or a gasoline engine 26, among others. ICE system 24 includes an exhaust system 30 that is fluidically connected to an aftertreatment or emissions control system 34. Exhaust produced by ICE system 24 passes through emissions control system 34 to reduce and/or convert emissions that may exit to ambient through an exhaust outlet pipe 36.

The technical solutions described herein are germane to ICE systems that can include, but are not limited to, diesel engine systems and gasoline engine systems. The ICE system 24 can include a plurality of reciprocating pistons attached to a crankshaft, which may be operably attached to a driveline, such as a vehicle driveline, to power a vehicle (e.g., deliver tractive torque to the driveline). For example, the ICE system 24 can be any engine configuration or application, including various vehicular applications (e.g., automotive, marine and the like), as well as various non-vehicular applications (e.g., pumps, generators and the like). While the ICEs may be described in a vehicular context (e.g., generating torque), other non-vehicular applications are within the scope of this disclosure. Therefore, when reference is made to a vehicle, such disclosure should be interpreted as applicable to any application of an ICE system.

Moreover, an ICE can generally represent any device capable of generating an exhaust gas stream comprising gaseous (e.g., NOx, O2), carbonaceous, and/or particulate matter species, and the disclosure herein should accordingly be interpreted as applicable to all such devices. As used herein, "exhaust gas" refers to any chemical species or mixture of chemical species which may require treatment, and includes gaseous, liquid, and solid species. For example, an exhaust gas stream may contain a mixture of one or more NOx species, one or more liquid hydrocarbon species, and one more solid particulate species (e.g., ash). It should be further understood that the embodiments disclosed herein may be applicable to treatment of effluent streams not comprising carbonaceous and/or particulate matter species, and, in such instances, ICE 26 can also generally represent any device capable of generating an effluent stream comprising such species. Exhaust gas particulate matter generally includes carbonaceous soot, and other solid and/or liquid carbon-containing species which are germane to ICE exhaust gas or form within an emissions control system 34.

Figure 2:
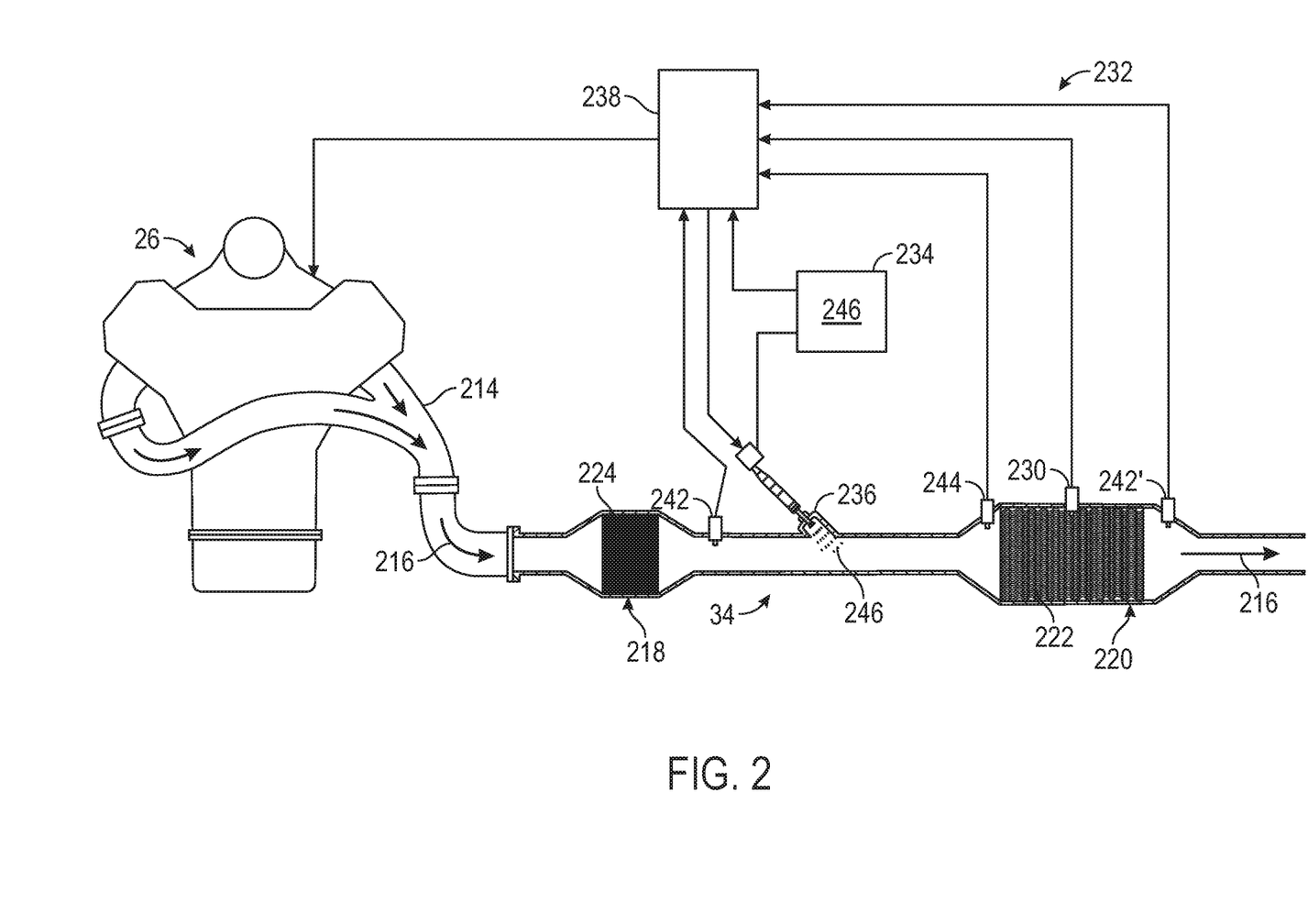
FIG. 2 illustrates example components of an emissions control system, according to one or more embodiments.

FIG. 2 illustrates example components of the emissions control system 34 according to one or more embodiments. The emissions control system 34 facilitates the control and monitoring of NOx storage and/or treatment materials, to control exhaust produced by the ICE system 24. For example, the technical solutions herein provide methods for controlling selective catalytic reduction devices (SCR), and appurtenant NOx sensors, wherein the SCRs are configured to receive exhaust gas streams from an exhaust gas source. As used herein, "NOx" refers to one or more nitrogen oxides. NOx species can include $N_yO_x$ species, wherein y>0 and x>0. Non-limiting examples of nitrogen oxides can include $NO$, $NO_2$, $N_2O$, $N_2O_2$, $N_2O_3$, $N_2O_4$, and $N_2O_5$. SCRs are configured to receive reductant, such as at variable dosing rates as will be described below.

The exhaust gas conduit 214, which may comprise several segments, transports exhaust gas 216 from the engine 26 to the various exhaust treatment devices of the emissions control system 34. For example, as illustrated, the emission control system 34 includes a SCR 220. In one or more examples, the SCR 220 can include a selective catalytic filter (SCRF) device, which provides the catalytic aspects of an SCR in addition to particulate filtering capabilities. Additionally or alternatively, the SCR catalyst can also be coated on a flow through substrate. As can be appreciated, system 34 can include various additional treatment devices, including an oxidation catalyst device (OC) 218, and particulate filter devices (not shown), among others.

As can be appreciated, the OC 218 can be one of various flow-through, oxidation catalyst devices known in the art. In various embodiments the OC 218 may include a flow-through metal or ceramic monolith substrate 224. The substrate 224 may be packaged in a stainless steel shell or canister having an inlet and an outlet in fluid communication with the exhaust gas conduit 214. The substrate 224 may include an oxidation catalyst compound disposed thereon. The oxidation catalyst compound may be applied as a washcoat and may contain platinum group metals such as platinum (Pt), palladium (Pd), rhodium (Rh) or other suitable oxidizing catalysts, or combination thereof. The OC 218 is useful in treating unburned gaseous and non-volatile HC and CO, which are oxidized to form carbon dioxide and water. A washcoat layer includes a compositionally distinct layer of material disposed on the surface of the monolithic substrate or an underlying washcoat layer. A catalyst can contain one or more washcoat layers, and each washcoat layer can have unique chemical catalytic functions. In the SCR 220, the catalyst compositions for the SCR function and NH3 oxidation function can reside in discrete washcoat layers on the substrate or, alternatively, the compositions for the SCR and NH3 oxidation functions can reside in discrete longitudinal zones on the substrate.

The SCR 220 may be disposed downstream from the OC 218. In one or more examples, the SCR 220 includes a filter portion 222 that can be a wall flow filter that is configured to filter or trap carbon and other particulate matter from the exhaust gas 216. In at least one exemplary embodiment, the filter portion 222 is formed as a particulate filter (PF), such as a diesel particulate filter (DPF). The filter portion (i.e., the PF) may be constructed, for example, using a ceramic wall flow monolith exhaust gas filter substrate, which is packaged in a rigid, heat resistant shell or canister. The filter portion 222 has an inlet and an outlet in fluid communication with exhaust gas conduit 214 and may trap particulate matter as the exhaust gas 216 flows therethrough. It is appreciated that a ceramic wall flow monolith filter substrate is merely exemplary in nature and that the filter portion 222 may include other filter devices such as wound or packed fiber filters, open cell foams, sintered metal fibers, etc. The emissions control system 34 may also perform a regeneration process that regenerates the filter portion 222 by burning off the particulate matter trapped in the filter substrate, in one or more examples.

In one or more examples, the SCR 220 receives reductant, such as at variable dosing rates. Reductant 246 can be supplied from a reductant supply source 234. In one or more examples, the reductant 246 is injected into the exhaust gas conduit 214 at a location upstream of the SCR 220 using an injector 236, or other suitable method of delivery. The reductant 246 can be in the form of a gas, a liquid, or an aqueous solution, such as an aqueous urea solution. In one or more examples, the reductant 246 can be mixed with air in the injector 236 to aid in the dispersion of the injected spray. The catalyst containing washcoat disposed on the filter portion 222 or a flow through catalyst or a wall flow filter may reduce NOx constituents in the exhaust gas 216. The SCR 220 utilizes the reductant 246, such as ammonia (NH3), to reduce the NOx. The catalyst containing washcoat may contain a zeolite and one or more base metal components such as iron (Fe), cobalt (Co), copper (Cu), or vanadium (V), which can operate efficiently to convert NOx constituents of the exhaust gas 216 in the presence of NH3. In one or more examples, a turbulator (i.e., mixer) (not shown) can also be disposed within the exhaust conduit 214 in close proximity to the injector 236 and/or the SCR 220 to further assist in thorough mixing of reductant 246 with the exhaust gas 216 and/or even distribution throughout the SCR 220.

The emissions control system 34 further includes a reductant delivery system 232 that introduces the reductant 246 to the exhaust gas 216. The reductant delivery system 232 includes the reductant supply 234 and the injector 236. The reductant supply 234 stores the reductant 246 and is in fluid communication with the injector 236. The reductant 246 may include, but is not limited to, NH3. Accordingly, the injector 236 may inject a selectable amount of reductant 246 into the exhaust gas conduit 214 such that the reductant 246 is introduced to the exhaust gas 216 at a location upstream of the SCR 220.

In one or more examples, the emissions control system 34 further includes a control module 238 operably connected, via a number of sensors, to monitor the engine 26 and/or the exhaust gas treatment system 34. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality. For example, module 238 can execute a SCR chemical model, as described below. The control module 238 can be operably connected to ICE system 24, SCR 220, and/or one or more sensors. As shown, the sensors can include an upstream NOx sensor 242 and downstream NOx sensor 242', disposed downstream of SCR 220, each of which are in fluid communication with exhaust gas conduit 214. In one or more examples, the upstream NOx sensor 242 is disposed downstream of the ICE 26 and upstream of both SCR 220 and the injector 236. The upstream NOx sensor 242 and the downstream NOx sensor 242' detect a NOx level proximate their location within exhaust gas conduit 214, and generate a NOx signal, which corresponds to the NOx level. A NOx level can comprise a concentration, a mass flow rate, or a volumetric flow rate, in some embodiments. A NOx signal generated by a NOx sensor can be interpreted by control module 238, for example. Control module 238 can optionally be in communication one or more temperature sensors, such as upstream temperature sensor 244, disposed upstream from SCR 220.

The sensors of the emissions control system 34 may further include at least one pressure sensor 230 (e.g., a delta pressure sensor). The delta pressure sensor 230 may determine the pressure differential (i.e., Δp) across the SCR 220. Although a single delta pressure sensor 230 is illustrated, it is appreciated that a plurality of pressure sensors may be used to determine the pressure differential of the SCR 220. For example, a first pressure sensor may be disposed at the inlet of the SCR 220 and a second pressure sensor may be disposed at the outlet of the SCR 220. Accordingly, the difference between the pressure detected by the second delta pressure sensor and the pressure detected by the first delta pressure sensor may indicate the pressure differential across the SCR 220. It should be noted that in other examples, the sensors can include different, additional, or fewer sensors than those illustrated/described herein.

In one or more examples, the SCR 220 includes one or more components that utilize the reductant 246 and a catalyst to transform NO and NO2 from the exhaust gases 216. The SCR 220 can include, for example, a flow-through ceramic or metal monolith substrate that can be packaged in a shell or canister having an inlet and an outlet in fluid communication with the exhaust gas conduit 214 and optionally other exhaust treatment devices. The shell or canister can ideally comprise a substantially inert material, relative to the exhaust gas constituents, such as stainless steel. The substrate can include a SCR catalyst composition applied thereto.

The substrate body can, for example, be a ceramic brick, a plate structure, or any other suitable structure such as a monolithic honeycomb structure that includes several hundred to several thousand parallel flow-through cells per square inch, although other configurations are suitable. Each of the flow-through cells can be defined by a wall surface on which the SCR catalyst composition can be washcoated. The substrate body can be formed from a material capable of withstanding the temperatures and chemical environment associated with the exhaust gas 216. Some specific examples of materials that can be used include ceramics such as extruded cordierite, α-alumina, silicon carbide, silicon nitride, zirconia, mullite, spodumene, alumina-silica-magnesia, zirconium silicate, sillimanite, petalite, or a heat and corrosion resistant metal such as titanium or stainless steel. The substrate can comprise a non-sulfating TiO2 material, for example. The substrate body can be a PF device, as will be discussed below.

The SCR catalyst composition is generally a porous and high surface area material which can operate efficiently to convert NOx constituents in the exhaust gas 216 in the presence of a reductant 246, such as ammonia. For example, the catalyst composition can contain a zeolite impregnated with one or more base metal components such as iron (Fe), cobalt (Co), copper (Cu), vanadium (V), sodium (Na), barium (Ba), titanium (Ti), tungsten (W), and combinations thereof. In a particular embodiment, the catalyst composition can contain a zeolite impregnated with one or more of copper, iron, or vanadium. In some embodiments the zeolite can be a β-type zeolite, a Y-type zeolite, a ZM5 zeolite, or any other crystalline zeolite structure such as a Chabazite or a USY (ultra-stable Y-type) zeolite. In a particular embodiment, the zeolite comprises Chabazite. In a particular embodiment, the zeolite comprises SSZ. Suitable SCR catalyst compositions can have high thermal structural stability, particularly when used in tandem with particulate filter (PF) devices or when incorporated into SCRF devices, which are regenerated via high temperature exhaust soot burning techniques.

The SCR catalyst composition can optionally further comprise one or more base metal oxides as promoters to further decrease the SO₃ formation and to extend catalyst life. The one or more base metal oxides can include WO₃, Al₂O₃, and MoO₃, in some embodiments. In one embodiment, WO₃, Al₂O₃, and MoO₃ can be used in combination with V₂O₅.

The SCR catalyst generally uses the reductant 246 to reduce NOx species (e.g., NO and NO2) to harmless components. Harmless components include one or more of species which are not NOx species, such as diatomic nitrogen, nitrogen-containing inert species, or species which are considered acceptable emissions, for example. The reductant 246 can be NH₃, such as anhydrous ammonia or aqueous ammonia, or generated from a nitrogen and hydrogen rich substance such as urea (CO(NH₂)₂). Additionally or alternatively, the reductant 246 can be any compound capable of decomposing or reacting in the presence of exhaust gas 216 and/or heat to form ammonia. Equations (1)-(5) provide exemplary chemical reactions for NOx reduction involving ammonia.

$$6NO+4NH3 \rightarrow 5N2+6H2O \tag{1}$$

$$4NO+4NH3+O2 \rightarrow 4N2+6H2O \tag{2}$$

$$6NO2+8NH3 \rightarrow 7N2+12H2O \tag{3}$$

$$2NO2+4NH3+O2 \rightarrow 3N2+6H2O \tag{4}$$

$$NO+NO2+2NH3 \rightarrow 2N2+3H2O \tag{5}$$

It should be appreciated that Equations (1)-(5) are merely illustrative, and are not meant to confine the SCR 220 to a particular NOx reduction mechanism or mechanisms, nor preclude the operation of other mechanisms. The SCR 220 can be configured to perform any one of the above NOx reduction reactions, combinations of the above NOx reduction reactions, and other NOx reduction reactions.

The reductant 246 can be diluted with water in various implementations. In implementations where the reductant 246 is diluted with water, heat (e.g., from the exhaust) evaporates the water, and ammonia is supplied to the SCR 220. Non-ammonia reductants can be used as a full or partial alternative to ammonia as desired. In implementations where the reductant 246 includes urea, the urea reacts with the exhaust to produce ammonia, and ammonia is supplied to the SCR 220. Equation (6) below provides an exemplary chemical reaction of ammonia production via urea decomposition.

$$CO(NH2)2+H2O \rightarrow 2NH3+CO2 \tag{6}$$

It should be appreciated that Equation (6) is merely illustrative, and is not meant to confine the urea or other reductant 246 decomposition to a particular single mechanism, nor preclude the operation of other mechanisms.

The SCR catalyst can store (i.e., absorb, and/or adsorb) reductant for interaction with exhaust gas 216. For example, the reductant 246 can be stored within the SCR 220 or catalyst as ammonia. A given SCR 220 has a reductant capacity, or an amount of reductant or reductant derivative it is capable of storing. The amount of reductant stored within an SCR 220 relative to the SCR catalyst capacity can be referred to as the SCR "reductant loading"/"NH3 storage level", and can be indicated as a % loading (e.g., 90% reductant loading) in some instances. During operation of SCR 220, injected reductant 246 is stored in the SCR catalyst and consumed during reduction reactions with NOx species and must be continually replenished. Determining the precise amount of reductant 246 to inject is critical to maintaining exhaust gas emissions at acceptable levels: insufficient reductant levels within the system 34 (e.g., within SCR 220) can result in undesirable NOx species emissions ("NOx breakthrough") from the system (e.g., via a vehicle tailpipe), while excessive reductant 246 injection can result in undesirable amounts of reductant 246 passing through the SCR 220 unreacted or exiting the SCR 220 as an undesired reaction product ("reductant slip"). Reductant slip and NOx breakthrough can also occur when the SCR catalyst is below a "light-off" temperature, for example if the SCR 220 is saturated with NH3 (i.e. no more storage sites). SCR dosing logic can be utilized to command reductant 246 dosing, and adaptations thereof, and can be implemented by module 238. For example, the control module 238 can control operation of the injector 236 based on a chemical model and a desired reductant (e.g., NH3) storage set point to determine an amount of reductant 246 to be injected as described herein.

Figure 3:
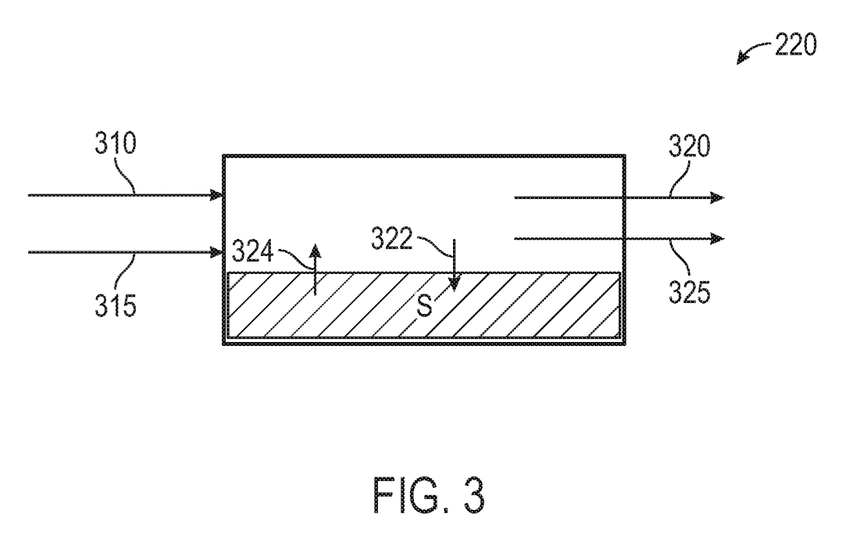
FIG. 3 illustrates an example flow of the gases through an selective catalytic reduction device, according to one or more embodiments.

As just described, FIG. 3 illustrates an example flow of the gas exhaust through the SCR 220, according to one or more embodiments. The control module 238 measures characteristics of the emissions control system 34, such as flow rate (F) of gas volume, and concentration C of the gas. For example, the SCR 220 determines an input flow-rate of NOx 310 as FCNOx,in, where F is the volume of the incoming gas 216, and CNOx,in is the inlet concentration of NOx in the incoming gas 216. Similarly, FCNH3,in is the volume of the flow-rate of NH3 315 in the incoming gas 216, CNH3,in being the inlet concentration of NH3. Further, compensating for the amount of adsorption 322 and amount of desorption 324, and the amounts reacted on the catalyst surface, the control module 238 may determine CNH3 as the SCR concentration of NH3, and CNOx as SCR concentration of NOx. Accordingly, FCNOx is the NOx outlet volume flow rate 320 of NOx through the outlet of the SCR 220.

A reductant injection dosing rate (e.g., grams per second) can be determined by a SCR chemical model which predicts an NH3 storage level of the SCR 220 based on signals from one or more of reductant 246 injection (e.g., feedback from injector 236) and upstream NOx (e.g., NOx signal from upstream NOx sensor 242). The SCR chemical model further predicts NOx levels of exhaust gas 216 discharged from the SCR 220. The SCR chemical model, and the strategies and methods described below, can be implemented by control module 238, or alternatively by one or more electric circuits, or by the execution of logic that may be provided or stored in the form of computer readable and/or executable instructions. In one or more examples, the NH3 storage set-point ("set-point") is calibrate-able. The control module 238 uses the chemical model to estimate the current storage level of NH3 in the SCR 220, and the storage level governor provides feedback to the injection controls to determine the injection rate to provide NH3 for reactions according to the chemical model and to maintain a target storage level. The set-point may indicate a target storage level for given operating conditions (e.g., a temperature of the SCR catalyst). Accordingly, the set-point may indicate a storage level (S) and a temperature (T) of the SCR 220. The set-point may be denoted as (S, T). The control module 238 controls the reductant injector 236 to manage the amount of reducing agent injected into the exhaust gas 216 to adjust the storage level of the SCR 220 to the set-point. For example, the control module 238 commands the injector 236 to increase or decrease the storage level to reach the set-point when a new set-point is determined. Additionally, the control module 238 commands the reductant injector 236 to increase or decrease the storage level to maintain the set-point when the set-point has been reached.

The SCR chemical model can be updatable by one or more process values over time, for example. A dosing governor (not shown), such as one controlled by module 238, monitors the reductant storage level predicted by the SCR chemical model, and compares the same to a desired reductant storage level. Deviations between the predicted reductant storage level and the desired reductant storage level can be continuously monitored and a dosing adaptation (i.e., correction) can be triggered to increase or decrease reductant dosing in order to eliminate or reduce the deviation. For example, the reductant dosing rate can be adapted to achieve a desired NOx concentration or flow rate in exhaust gas 216 downstream of the SCR 220, or achieve a desired NOx conversion rate. A desired conversion rate can be determined by many factors, such as the characteristics of SCR catalyst type and/or operating conditions of the system (e.g., ICE 26 operating parameters).

Over time, inaccuracies of the SCR chemical model can compound to appreciable errors between modeled SCR reductant storage level and actual storage level. Accordingly, the SCR chemical model can be continuously corrected to minimize or eliminate errors. One method for correcting an SCR chemical model includes comparing the modeled SCR discharge exhaust gas NOx levels to the actual NOx levels (e.g., as measured by downstream NOx sensor 242') to determine a discrepancy, and subsequently correcting the model to eliminate or reduce the discrepancy. Because NOx sensors (e.g., downstream NOx sensor 242') are cross-sensitive to reductant (e.g., NH3) and NOx, it is critical to distinguish between reductant signals and NOx signals as reductant slip can be confused with insufficient NOx conversion.

Intrusive tests can be used to distinguish between reductant signals and NOx signals, which include modulating reductant dosing for a period of time. Modulating reductant dosing comprises dosing reductant at a different amount and/or frequency than what would normally be dosed at the current conditions. Specifically, modulating can comprising halting all reductant dosing for a period of time, reducing an amount of reductant dosing for a period of time, and/or increasing reductant dosing for a period of time. In one embodiment, modulating reductant dosing comprises dosing less than the amount of reductant normally commanded by the chemical model, and optionally subsequently dosing reductant. The subsequent reductant dose can be higher than the amount of reductant normally commanded by the chemical model, in some embodiments. Intrusive tests can be utilized while emissions control system 34 is in steady state, and can be referred to as steady state slip detection (SSSD) tests. At steady state, modulating the reductant dosing allows NH3 and NOx concentrations detected by a NOx sensor (e.g., sensor 242') to be distinguished.

"Steady state" generally refers to a condition at which the NOx concentrations of exhaust gas 216 communicated to SCR 220 are sufficiently constant. Steady state can be determined, for example, by taking the root mean square (RMS) value of a NOx signal upstream from SCR 220 (e.g., such as measured by upstream NOx sensor 242) over a moving time frame; a sufficiently small RMS value indicates a minimal variation in upstream NOx concentration and the SCR can be considered to be in steady state. It should be noted that other techniques may be used to determine if the vehicle is operating in a steady state, such as using engine fuel NOx gradient, or any other measurements. For example, a steady state condition can be comprise a RMS value of the upstream NOx concentration of less than a predetermined value, such as about 30 ppm, less than about 20 ppm, or less than about 10 ppm. SCR steady state conditions can often correlate with ICE 26 steady state conditions (e.g., generally consistent RPM, fuel injection, temperature, etc.)

Figure 4:
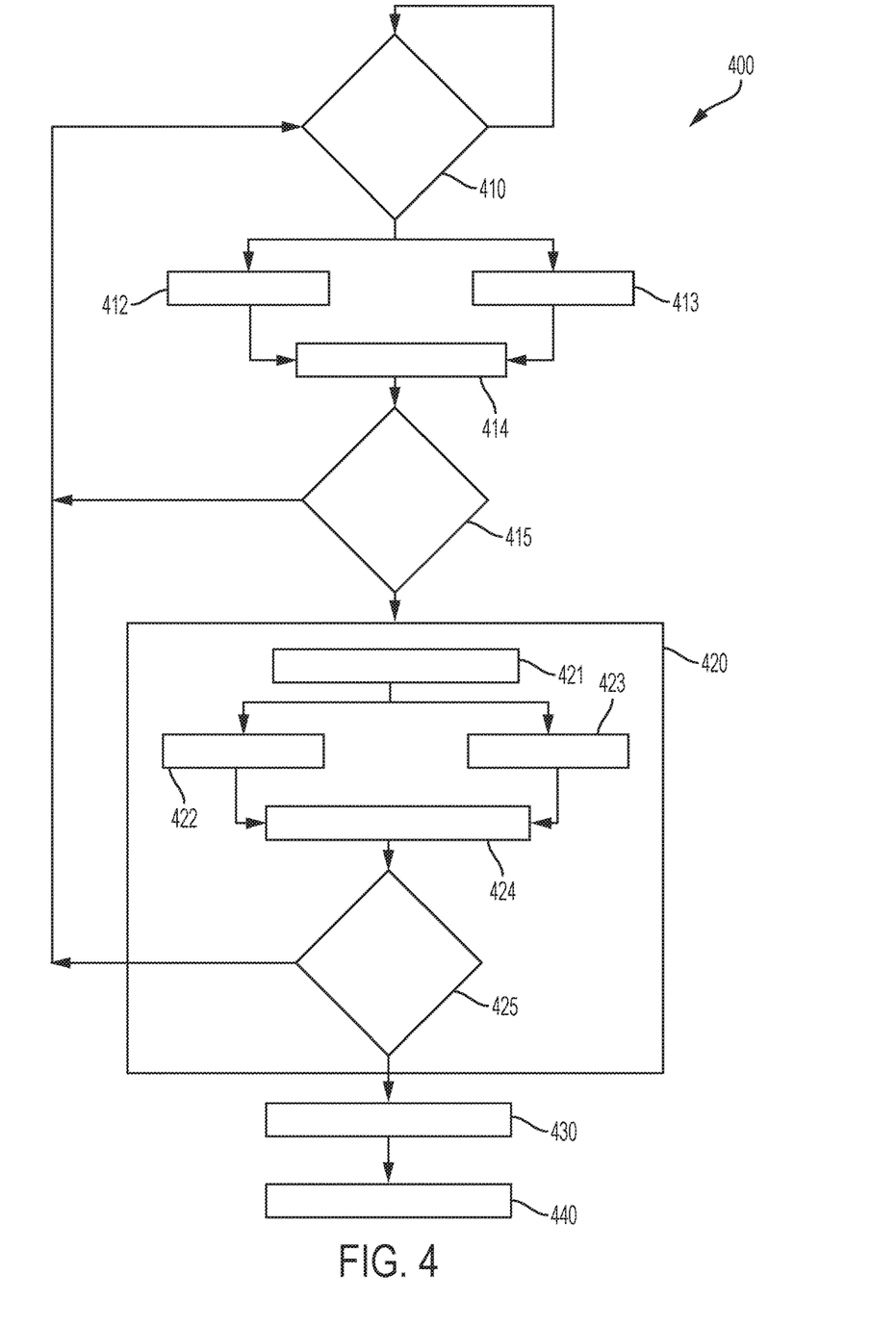
FIG. 4 illustrates a flowchart of a method for implementing steady state dosing correction of a selective catalytic reduction device, according to one or more embodiments.

SSSD tests can be utilized in a steady state dosing correction (SSDC) strategy, or method 400, as illustrated in the flowchart of FIG. 4. In general, method 400 is an adaptive semi-closed loop control strategy to maintain SCR performance according to the chemical model, where the control module continuously learns one or more parameters associated with the chemical model according to the ongoing performance of the motor vehicle 10.

Method 400 includes determining 410 if the SCR 220 and/or the ICE 26 is in "steady state" (e.g., a preselected engine operating condition where the NOx produced by the engine is substantially constant). For example, a steady state operating condition may correspond to a condition where the vehicle 10 is motoring, e.g., engine speed or load is substantially constant. Method 400 continues to iteratively perform the subsequent steps of the method while the steady state conditions persist. Once a steady state condition is determined, method 400 further comprises measuring 412 a downstream NOx measurement (e.g., from the downstream NOx sensor 242'), predicting 413 a predicted downstream NOx value (e.g., via the chemical model of the SCR 220), and comparing the NOx measurement with the predicted NOx value to determine 414 a NOx error. The predicted downstream NOx value can be determined based on the chemical model and semi-closed loop calculations described herein, along with one or more sensor values, such as inlet/outlet temperature, inlet/outlet pressure, and earlier NOx measurements, among others. Comparing the NOx measurement from the sensor with the predicted NOx value can comprise determining 414 a difference between the two values. A comparison 414 of the NOx measurement from the sensor and the predicted NOx value can comprise a difference between the NOx measurement from the sensor and the predicted NOx value of the chemical model, for example.

Method 400 further comprises comparing 415 the NOx error with a SSSD NOx error threshold. If the NOx error is less than the NOx error threshold, method 400 iterates back to determining 410 if the SCR 220 and/or the ICE 26 is in steady state. If the NOx error is greater than the NOx error threshold, method 400 proceeds to SSSD 420. For example, the NOx measurement and predicted NOx value may indicate a concentration of NOx in the exhaust gases 216. In such a case, in one or more examples, the NOx error threshold may be a predetermined concentration of NOx, such as 37.5 ppm (or any other value). In one or more examples, the NOx error threshold may be determined based on a specified statistic such as a standard deviation, for example 1.5 standard deviation. For example, the NOx error threshold can be calibrated to a modeled downstream NOx value. The measured downstream NOx is thus normalized against the expected error of the sensor. The normalized error, 1.5 in this example, is then compared to the threshold for entry into SSSD logic. The NOx error threshold of the concentration of the NOx that is used as the threshold for comparison, in such cases, is computed based on the earlier values of the NOx measured by the NOx sensor 242'. In other words, in the above example scenario, the 37.5 ppm is used as the threshold value because 37.5 is the 1.5 standard deviation value of earlier NOx measurements. It should be noted that in one or more examples, the NOx measurement and predicted value used may be a NOx flow rate, or any other NOx attribute (instead of the NOx concentration).

SSSD 420 is implemented in order to correct the chemical model such that NOx breakthrough and/or NH3 slip are reduced or eliminated. SSSD 420 comprises modulating reductant 246 dosing 421, and determining a degree of NOx breakthrough or reductant slip. Determining a degree of NOx breakthrough or reductant slip, for example, can comprise measuring 422 a downstream NOx measurement (e.g., from the downstream NOx sensor 242'), predicting 423 a predicted downstream NOx value (e.g., via the chemical model of the SCR 220), comparing 424 the NOx measurement with the predicted NOx value to determine a SSSD NOx error, and comparing 425 the NOx error with a SSSD NOx error threshold. Modulating reductant 246 dosing 421 reduces and/or increases the amount of reductant 246 in SCR 220 such that the downstream NOX sensor 242' cross-sensitivity to NOx and NH3 can be interpreted to determine if NOx breakthrough or NH3 slip is occurring. The SSSD NOx error threshold can comprises a respective NOx breakthrough threshold or reductant slip threshold, depending on whether NOx breakthrough or reductant slip are identified. If the SSSD NOx error is less than the SSSD NOx error threshold, method 400 iterates back to determining 410 if the SCR 220 and/or the ICE 26 is in steady state. If the SSSD NOx error is greater than the SSSD NOx error threshold, method 400 adapts 430 via a short-term adaptation. The SSSD NOx error threshold is set in order to only adapt 430 if the SSSD NOx error is sufficiently large to justify a short term adaptation.

In general, a short term adaptation effects a change in reductant 246 dosing commensurate with the identified needs of the system. Specifically, reductant 246 dosing is increased if NOx breakthrough is occurring, and reductant 246 dosing is decreased if NH3 slip is occurring. A short term adaptation can manipulate reductant 246 dosing in one or more ways, such as by manipulating the SCR 220 reductant loading (e.g., as it is determined by the chemical model), by manipulating the energizing time of the injector 236, or by adjusting an alpha ratio, among other examples. For example, if NH3 slip is occurring, the chemical model estimation of SCR 220 reductant loading can be decreased. In another example, if NOx breakthrough is occurring, the energizing time of the injector 236 can be increased. In some embodiments, system 30 controls dosing, in additional to or as an alternative to a chemical model, by seeking to maintain a constant alpha ratio. An alpha ratio comprises a ratio of NH3 to NOx, wherein NH3 can comprise the NH3 stored in the SCR 220 (e.g., grams of NH3 per liter of SCR volume), and NOx comprises the NOx conversion percent (e.g., calculated using an upstream NOx concentration and a downstream NOx concentration). A short term adaptation can accordingly comprise manipulating the alpha ratio (e.g., by a multiplier). A plausibility timer can be set to define the duration that the short term adaptation remains in effect. In some embodiments, a successive implementation of SSSD 420 is prevented until the plausibility timer has expired.

Method 400 can further adapt reductant dosing 440 via a long-term adaptation if certain conditions are met. Similar to short term adaptations, a long term adaptation effects a change in reductant 246 dosing commensurate with the identified needs of the system. Specifically, reductant 246 dosing is increased if NOx breakthrough is occurring, and reductant 246 dosing is decreased if NH3 slip is occurring. A long term adaptation can manipulate reductant 246 dosing in one or more ways, such as by manipulating the SCR 220 reductant loading (e.g., as it is determined by the chemical model), or by manipulating the energizing time of the injector 236. In one embodiment, an energizing time multiplier is applied to chemical model to increase or decrease an amount of reductant 246 injected for a given dosing event. Such a long term adaptation can correct for systemic issues such as injector drift (i.e., irregular, unpredicted, or undesired injector performance), and system bias, for example. For example, if the magnitude of one or more short term adaptations within a time period (e.g., elapsed operating time of a vehicle) exceed a short term adaptation threshold, the chemical model can adapt via a long term adaptation. The magnitude of short term adaptations can comprise a count of the number of short term adaptations within a time period, and/or an integration of one or more short term adaptations within a time period, among other examples. In some additional or alternative embodiments, a long term adaptation can comprise manipulating the alpha ratio (e.g., by a multiplier). In some embodiments, a threshold number of short term adaptations may be required before a long term adaptation can be considered.

Figure 5:
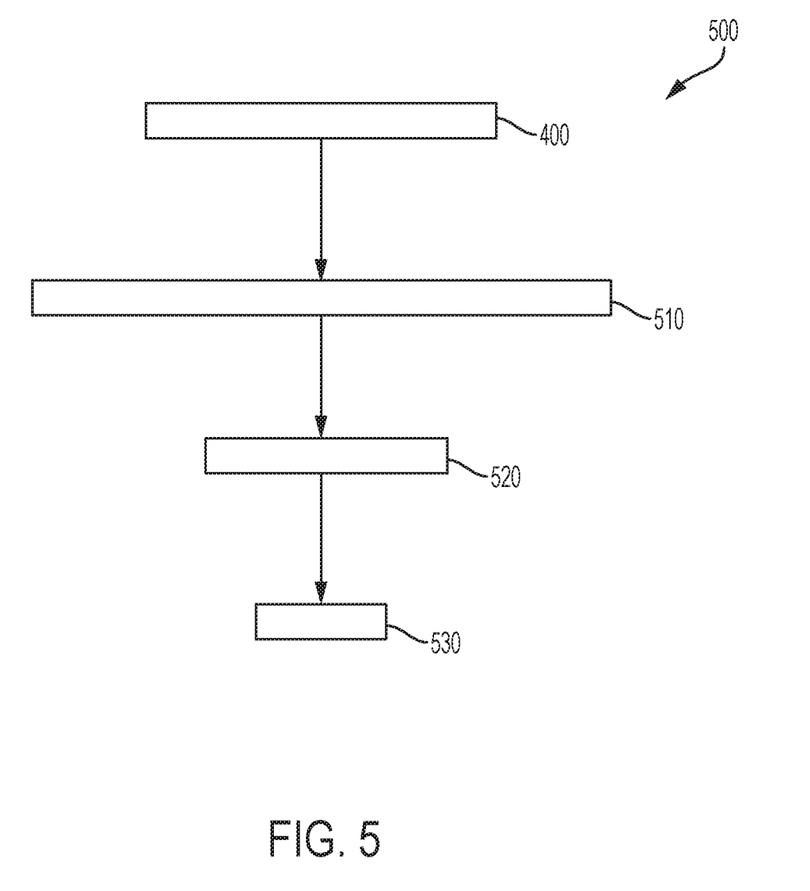
FIG. 5 illustrates a flowchart of a method for controlling a selective catalytic reduction system, according to one or more embodiments.

A drawback of SSDC strategies, such as method 400, is that NOx emissions may increase during implementation. Further, in the steady state, the SSSD NOx measurement error may not be high enough to trigger a short term adaptation. Additionally or alternatively, the system may cycle in and out of SSSD and/or SSDC without effecting suitable improvement to NOx error (e.g., between the measured downstream NOx value and the predicted NOx value of the chemical model). Accordingly, FIG. 5 illustrates a method 500 for controlling a SCR system, comprising performing 400 SSDC (method 400) over a period of time, determining 510 that the SSDC is insufficiently improving SCR performance over the period of time, and inhibiting 530 SSSD. Method 500 can optionally further comprise modifying 520 SSDC protocol. Determining 510 at the SSDC is insufficiently improving SCR performance over the period of time can be based on the number of SSSD events occurring within a period of time and the change in NOx error during the time period. In other words, determining 510 assesses the efficacy of SSSD events in improving the chemical model accuracy and accordingly SCR 220 performance.

Modifying 520 SSDC protocol can comprise one or more of increasing the plausibility timer, decreasing one or more of the NOx breakthrough threshold and reductant slip threshold (i.e., the SSSD NOx error threshold), and reducing the short term adaptation threshold. By increasing the plausibility timer, the impact of one or more short term adaptations on the system, and accordingly the probability that a long term adaptation will occur, will increase. The plausibility time can be increased for one short term adaptation, or for a plurality of short term adaptations. By decreasing one or more of the NOx breakthrough threshold and reductant slip threshold, the probability of an adaptation via a short term adaptation will increase. For example, the SSSD NOx error threshold can be mapped to the number of intrusive SSSD events within a time period, and optionally further mapped to the average change in NOx error (as determined 414 by method 400) over the time period. By reducing the short term adaptation threshold, the probability of an adaptation via a long term adaptation will increase. Accordingly, under one or more of the above SSDC protocol modifications, each intrusive SSSD event is more likely to improve the accuracy of the chemical model and SCR 220 performance.

Inhibiting 530 SSSD can comprise preventing intrusive events from occurring for an inhibition period. The inhibition period can begin after the plausibility timer for the most recent short term adaptation has expired, for example. In other embodiments, inhibiting 530 SSSD can comprise temporarily increasing the NOx error threshold. In other embodiments, inhibiting 530 SSSD can comprise permanently increasing the NOx error threshold. The NOx error threshold can be permanently increased if the magnitude of temporary NOx error threshold increases within a time period exceeds a threshold. For example, the threshold can be a number of temporary increases to the NOx error threshold within a given time period, or an integration of the NOx error threshold increases within a time period.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for controlling a selective catalytic reduction device (SCR) system, wherein the SCR is configured to receive exhaust gas and reductant, and the system further includes a controller capable of predicting NOx concentration downstream of the SCR and controlling reductant dosing to the SCR via a computer implemented chemical model, wherein iteratively during steady state conditions the system performs a steady state dosing correction (SSDC) protocol by comparing a SCR downstream NOx measurement with a predicted NOx value to determine a NOx error, initiating an intrusive event by modulating reductant dosing to determine a degree of NOx breakthrough or reductant slip occurring prior to initiation of the intrusive event if the NOx error exceeds a NOx error threshold, making a short term adaptation to reductant dosing in order to reduce NOx breakthrough or reductant slip for a period of time as determined by a plausibility timer if the degree of NOx breakthrough or reductant slip exceeds a respective NOx breakthrough threshold or reductant slip threshold, and optionally making a long term adaptation to reductant dosing if the magnitude of short term adaptations exceeds a short term adaptation threshold; the method comprising:
   determining that the SSDC is insufficiently improving SCR performance based on the number of intrusive events occurring within a period of time and a change in NOx error during the time period; and
   modifying the SSDC protocol by one or more of:
      increasing the plausibility timer,
      decreasing one or more of the NOx breakthrough threshold and reductant slip threshold, and
      reducing the short term adaptation threshold.

2. The method of claim 1, wherein the short term reductant dosing adaptation is made by modifying a reductant storage estimation of the chemical model.

3. The method of claim 1, wherein the reductant is dosed by a reductant injector, and the long term reductant dosing adaptation is made by modifying an energizing time of the reductant injector.

4. The method of claim 1, wherein the plausibility timer is modified for a plurality of intrusive events.

5. The method of claim 1, wherein the exhaust gas is communicated to the SCR by an internal combustion engine.

6. A method for controlling a selective catalytic reduction device (SCR) system, wherein the SCR is configured to receive exhaust gas and reductant, and the system further includes a controller capable of predicting NOx concentration downstream of the SCR and controlling reductant dosing to the SCR via a computer implemented chemical model, wherein iteratively during steady state conditions the system performs a steady state dosing correction (SSDC) protocol by comparing a SCR downstream NOx measurement with a predicted NOx value to determine a NOx error, initiating an intrusive event by modulating reductant dosing to determine a degree of NOx breakthrough or reductant slip occurring prior to initiation of the intrusive event if the NOx error exceeds a NOx error threshold, making a short term adaptation to reductant dosing in order to reduce NOx breakthrough or reductant slip for a period of time if the degree of NOx breakthrough or reductant slip exceeds a respective NOx breakthrough threshold or reductant slip threshold, and optionally making a long term adaptation to reductant dosing if the magnitude of short term adaptations exceeds a short term adaptation threshold; the method comprising:
- determining that the SSDC is insufficiently improving SCR performance based on the number of intrusive events occurring within a period of time and a change in NOx error during the time period; and
- inhibiting intrusive events from occurring.

7. The method of claim 6, wherein inhibiting intrusive events from occurring comprises preventing intrusive events from occurring for an inhibition period.

8. The method of claim 7, wherein a short term adaptation is effective for a period of time as determined by a plausibility timer, and the inhibition period begins after the plausibility timer for the most recent short term adaptation has expired.

9. The method of claim 6, wherein inhibiting intrusive events from occurring comprises temporarily increasing the NOx error threshold.

10. The method of claim 6, wherein inhibiting intrusive events from occurring comprising permanently increasing the NOx error threshold.

11. The method of claim 10, wherein the NOx error threshold is permanently increased if a magnitude of temporary NOx error threshold increases within a time period exceeds a permanent NOx error threshold.

12. The method of claim 11, wherein the permanent NOx error threshold comprises a number of temporary increases to the NOx error threshold within a given time period, or an integration of the NOx error threshold increases within a time period.

13. The method of claim 6, wherein the short term reductant dosing adaptation is made by modifying a reductant storage estimation of the chemical model.

14. The method of claim 6, wherein the reductant is dosed by a reductant injector, and the long term reductant dosing adaptation is made by modifying an energizing time of the reductant injector.

15. The method of claim 6, wherein the exhaust gas is communicated to the SCR by an internal combustion engine.

16. A method for controlling a selective catalytic reduction device (SCR) system, wherein the SCR is configured to receive exhaust gas and reductant, and the system further includes a controller capable of predicting NOx concentration downstream of the SCR and controlling reductant dosing to the SCR via a computer implemented chemical model, wherein iteratively during steady state conditions the system performs a steady state dosing correction (SSDC) protocol by comparing a SCR downstream NOx measurement with a predicted NOx value to determine a NOx error, initiating an intrusive event by modulating reductant dosing to determine the degree of NOx breakthrough or reductant slip occurring prior to initiation of the intrusive event if the NOx error exceeds a NOx error threshold, making a short term adaptation to reductant dosing in order to reduce NOx breakthrough or reductant slip for a period of time as determined by a plausibility timer if a degree of NOx breakthrough or reductant slip exceeds a respective NOx breakthrough threshold or reductant slip threshold, and optionally making a long term adaptation to reductant dosing if the magnitude of short term adaptations exceeds a short term adaptation threshold; the method comprising:
- determining that the SSDC is insufficiently improving SCR performance based on the number of intrusive events occurring within a period of time and a change in NOx error during the time period;
- modifying the SSDC protocol by one or more of:
  - increasing the plausibility timer,
  - decreasing one or more of the NOx breakthrough threshold and reductant slip threshold, and
  - reducing the short term adaptation threshold; and
    - subsequently inhibiting intrusive events from occurring.

17. The method of claim 16, wherein inhibiting intrusive events from occurring comprises one or more of preventing intrusive events from occurring for an inhibition period, temporarily increasing the NOx error threshold, or permanently increasing the NOx error threshold.

18. The method of claim 16, wherein the short term reductant dosing adaptation is made by modifying a reductant storage estimation of the chemical model.

19. The method of claim 16, wherein the reductant is dosed by a reductant injector, and the long term reductant dosing adaptation is made by modifying an energizing time of the reductant injector.

20. The method of claim 16, wherein the exhaust gas is communicated to the SCR by an internal combustion engine that powers a vehicle.

* * * * *